Jan. 9, 1962  W. J. GILBERT  3,016,251
SHAFT SEAL
Filed Jan. 8, 1959
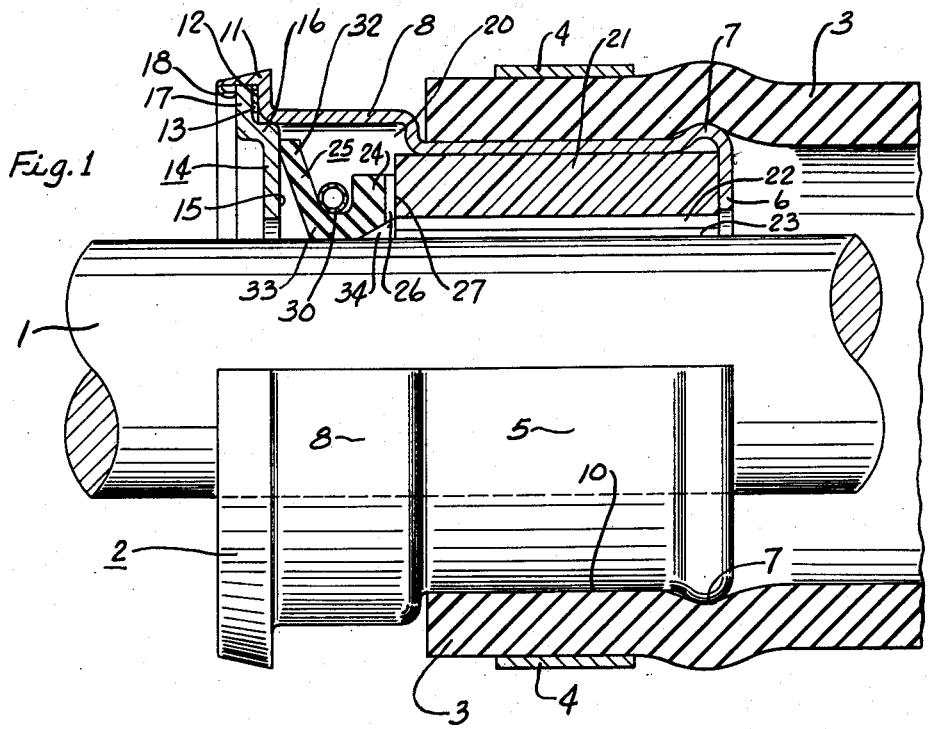
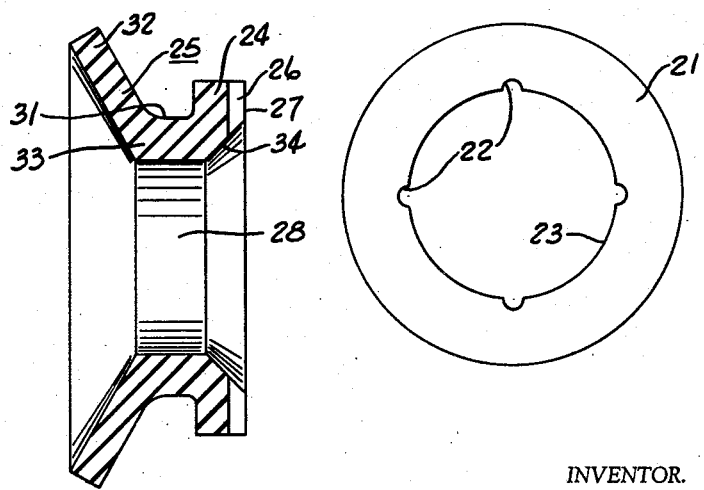
INVENTOR.
WALTER J. GILBERT
BY
HIS ATTORNEY

United States Patent Office 3,016,251
Patented Jan. 9, 1962

3,016,251
SHAFT SEAL
Walter J. Gilbert, Indiana, Pa., assignor to Syntron Company, Homer City, Pa., a corporation of Delaware
Filed Jan. 8, 1959, Ser. No. 785,633
10 Claims. (Cl. 286—11)

This invention relates generally to propeller shaft seals and more particularly to seals for yachts and smaller inboard craft.

The problem of providing an adequate seal for small craft is twofold, it must be simplified and sufficiently inexpensive to merit installation in competition to that of the stuffing box type of seal. Although the seal comprising this invention costs more than a stuffing box chamber with the usual screw gland member and rope packing material, the present seal takes less time to install and requires no further attention. The packing gland type of seal also wears the propeller shaft making it rough causing leaks whereas the present seal member has no relative motion with the shaft.

If there is considerable motion or vibration of the shaft it will engage a guide or unctious material which guides the movement of the seal with the shaft without wear on the shaft.

Another object is the provision of a shaft seal having a spun housing for retaining a guide and seal.

Another object is the provision of a shaft seal having only three principal parts, the housing, the guide and the seal member.

Another object is a seal that engages in sealed relation at low forward speeds when the seal is needed but becomes disengaged at high forward speeds to relieve the seal load and wear when cavitation around the propeller shaft coupled with boat speed does not require a seal.

Another object is the provision of a simplified and relatively inexpensive seal.

Other objects and advantages appear hereinafter in the following description and claims.

The accompanying drawing shows for the purpose of exemplification without limiting the invention or claims thereto certain practical embodiments illustrating the principles of this invention wherein:

FIG. 1 is an enlarged view partly in section illustrating the seal comprising this invention as mounted on a shaft.

FIG. 2 is a sectional view of the seal member.

FIG. 3 is an end view of the guide.

Referring to the drawings the seal comprising this invention is constructed to be a self-contained unitary member that may be slipped over the end of a shaft and mounted in position and will require no further attention owing to the fact that it is self-lubricating and since it is employed on propeller shafts of yachts and small inboard craft this seal is designed to open its sealing relation by centrifugal force at speeds where cavitation occurs in the water around the propeller shaft.

As shown in FIG. 1 the propeller shaft 1 extends through the tubular housing 2 which is clamped in the hose 3 by means of the clamp member 4, the hose extending to and being sealed on the hull adjacent the propeller end of the shaft. The hose 3 provides a flexible mounting of the seal relative to the hull of the ship and usually extends over and is clamped to a tube formed integral with the hull but much larger diameter than the shaft. The tubular housing 2 comprises the housing member 5 which is preferably spun from a metal such as brass or bronze to provide a tubular section having an abutment 6 at the propeller end of the shaft which represents the original disc from which the housing is spun. An annular ridge 7 is provided adjacent the abutment 6 which in combination with the bell-shaped member 8 provides a reduced section or portion 10 that represents the smallest diameter of the outer surface of the tubular housing 2 and around which the hose 3 is clamped by means of the hose clamp 4. When the pipe clamp tightly embraces the hose in the vicinity of the reduced section 10 of the housing, by means of the flexible hose 3 a very good sealing joint is completed between the hull and the tubular housing 2.

The inboard side of the tubular housing 2 is provided with a second bell member 11 which provides an annular face 12 for receiving the annular gasket 13 that forms the sealing seat of the end plate 14 carrying on its inner face the sealing surface 15. The end plate 14 is a washer which is preferably made with an offset as indicated at 16 so that it will center itself within the bell 8 of the tubular housing 2. The outer flange 17 of the end plate seals against the gasket within the outer bell 11 when the annular rib 18 is turned over and pressed downwardly against the annular flange 17 to hold the seal member in permanent assembled relation and provide the seal chamber 20 therein.

Thus the housing 2 with its end plate 14 represents a unitary housing or enclosure member and contains in the interior seal chamber 20 the long guide sleeve 21 which is made of unctious material such as bonded graphite that provides a self-lubrication to the rubber and metal members that it engages. This long sleeve 21 is provided with four grooves 22 and its bore 23 has a clearance with the shaft 1 as illustrated on the drawing. The longitudinal grooves 22 permit the access of water which travels along the shaft and through the slots or grooves 22 to the opposite end thereof or the bell 8. The sleeve 21 has a sliding fit in the reduced section 10 of the tubular housing 2 and it will be noted that the abutment 6, which in this instance is annular, provides a bore that is materially larger than the bore of the sleeve 21 or in fact larger than the depth of the grooves 22 in the sleeve 21. Thus any lateral motion of the shaft will permit the shaft to take up the clearance in the bore 23 of the sleeve 21 and engage the sleeve to move the same laterally with the shaft. The sleeve, of course, carries the housing therewith since there is little clearance between the exterior of the sleeve and the interior of the housing 2.

If the shaft is running true, it will not ordinarily engage the bore of the guide sleeve 21, however, if it does engage the bore the graphite or unctious material provides a lubrication between the sleeve 21 and the shaft thereby preventing wear of the shaft. Such lubrication will provide long wear of the unctious material from which the sleeve is made.

It will be noted that the abutment 6 and the length of the sleeve 21 are chosen so that the opposite end of the sleeve extends within the bell 8 forming the seal chamber 20. The end face of the sleeve 21 is engaged by the annular stub section 24 of the seal member 25. The stub section 24 has the radial slots 26 in the annular face 27 that bear against the end of the sleeve 21. The seal member, being made of an elastomer such as natural or synthetic rubber and being flexible, will wear a considerably long time against the end of the sleeve 21 as the sleeve 21 ordinarily will be sufficiently tight in the housing 2 so that it will not rotate. The graphite or unctious material of the sleeve will also lubricate the wearing surface 27 of the elastomer seal member as well as the shaft.

The bore 28 of the seal member is chosen to have a tight fit with the shaft 1 so that the latter can be forced therethrough but to insure good sealing relation as well as good clamping action between the seal member and the shaft a garter spring 30 is employed to hold the seal member 25 is position. The annular garter spring 30 will aid the seal member to grip the shaft so that it will rotate therewith at all times. However, the gripping action of the elastomer seal member will permit the shaft to be moved longitudinally through the seal both under operating conditions or during the time when the shaft is assembled or removed from the seal member. The garter member 30 lies in the trough 31 between the stub section 24 and the annular flange 32. The annular flange 32 extends outwardly from the base 33 of the seal so as to engage the sealing surface 15 on the end plate 14 closing the end of the housing. It will be noted that the hole in the end plate 14 is equally as large in diameter as the hole in the abutment 6 so as to prevent any engagement between the housing and the shaft due to lateral movement of the shaft. In other words, the shaft will always engage the guide sleeve 21 and move the whole assembly of the seal through this guide sleeve rather than directly engage the housing itself.

The flange 32 of the seal member 25 is flexed somewhat as illustrated in FIG. 1 when the seal member is assembled between sleeve 21 and the end plate 14. This seal member is likewise treated with a graphite material so as to lubricate the sealing surface between the flange 32 and the sealing surface 15 of the end plate 14 which is ordinarily made of brass or bronze.

When the boat or propeller shaft is at rest the water will pass upwardly through the hose 3, the grooves 22 to the recessed portion 34 in the base 33 of the seal member, thence outwardly through the radial slots 26 to the chamber 20. In view of the fact that the seal is ordinarily placed below the water line when the boat is stationary, the pressure of the water on the inner face of the flange 32 will maintain a proper sealing relation against the end plate 14. The same is true if the boat is backed up or moved rearwardly. Under such conditions, water is actually forced under pressure into the seal chamber and thus increases the pressure of the flange on the end plate. If the boat is travelling at slow speeds, the initial pressure by the flange 32 on the sealing surface 15 on the end plate 14 owing to the flexure of the flange is sufficient to make a sealing contact. However, after a boat has assumed a speed sufficient to cavitate the area around the shaft the seal is no longer necessary and the suction created by the cavitation will withdraw the water from the seal chamber 20 and actually put a suction in this chamber which together with the centrifugal action will cause the perimetral surface of the flange 32 to become disengaged from the sealing surface 15 and thereby avoid any wear between these relatively moving parts. Thus at high speeds when a seal is not needed there is no wear of the seal member on the flange of the seal member and a sufficient body of material provided in the abutment 24 of the seal member together with the natural lubrication between the seal member and the sleeve will prevent undue wearing of the abutment member.

If the boat does not attain high speeds or produce a cavitation in the form of a suction, the speeds are such that there is very little wear between the relatively moving parts of the seal and the water will cool the seal. If on the other hand, the shaft is driven at high speeds which will induce cavitation and suction on the seal then the seal member will be out of engagement and will not wear and there is no power loss or load due to friction or will not get warm since at this time no sealing is necessary under these conditions.

I claim:

1. A propeller shaft seal comprising a tubular housing having a chamber surrounding the propeller shaft and an abutment at one end, an antifriction sleeve with a bore providing clearance for the propeller shaft and contained in said housing with one end engaging said abutment, an annular flexible seal member having a bore to snugly fit the propeller shaft to seal thereon and to be rotated thereby, an annular stub section o one one end of said flexible seal member to engage the other end of said sleeve, an annular flange on the other end of said flexible seal member that is disposed at an acute angle relative to a transverse plane disposed normal to the axis of the bore of said flexible member, and an annular seal surface larger than said flange and supported on the other end of said housing and engaged by the outer face of said flange to permit said flange to ride laterally over said seal surface until the transverse movement of the propeller shaft traverses the sleeve clearance and the propeller shaft engages the sleeve to move the housing with said flange, whereby the angle of said flange is selected to maintain a sealing engagement with said annular sealing surface as said propeller shaft is at rest or traveling in reverse or at slow speeds preventing cavitation at the propeller shaft but said flange leaving contact with said sealing surface at higher speeds to eliminate wear and friction when water cavitation around said propeller shaft eliminates the necessity of a seal.

2. The seal of claim 1 characterized by longitudinal grooves in the bore of said sleeve, and radial grooves in the seal member engaging the face of said stub section to provide water access to said chamber.

3. The seal of claim 1 characterized in that said housing has an annular ridge adjacent said abutment.

4. The seal of claim 1 characterized in that said housing has an annular ridge adjacent both ends.

5. A propeller shaft seal comprising a tubular housing to be mounted on the propeller shaft, a chamber in said housing having an abutment at one end and a radial annular sealing surface at its other end, an antifrictional sleeve retained in said chamber with one end engaging said abutment, the bore of said sleeve providing annular radial clearance for the propeller shaft when extending therethrough, an annular flexible seal means having its bore to snugly fit the propeller shaft to seal thereon and to be rotated thereby, one end of said seal means engaging the other end of said sleeve, the other end of said seal means engaging said radial annular sealing surface to seal said housing, said radial annular sealing surface having greater radial dimension than the radial clearance between the bore of said sleeve and the propeller shaft to be sealed to permit a lateral movement of the propeller shaft to traverse the radial clearance of said sleeve bore to engage said sleeve and move the housing laterally within the limits of said radial annular sealing surface.

6. The propeller shaft seal of claim 5 characterized by longitudinal grooves in the bore of said sleeve.

7. The propeller shaft seal of claim 5 characterized by a radial groove in said seal means that engages said sleeve.

8. The propeller shaft seal of claim 5 characterized in that said seal means includes an annular base section that snugly fits and seals on a propeller shaft, an annular stub section extending from one end of said base section to engage said sleeve, and an annular flexible flange section that is disposed radially and axially outwardly from the other end of said base section to engage and seal on said radial annular sealing surface.

9. The propeller shaft seal of claim 8 characterized by a radial groove in the face of said annular stub section.

10. The propeller shaft seal of claim 8 characterized in that said annular flexible flange is constructed to flex radially outwardly to disengage from said radial annular sealing surface at a speed greater than that creating suction in said housing.

References Cited in the file of this patent

UNITED STATES PATENTS

| | | |
|---|---|---|
| 2,076,747 | Salisbury | Apr. 13, 1937 |
| 2,422,007 | Gilbert | June 10, 1947 |
| 2,562,624 | Loofbourrow | July 31, 1951 |
| 2,565,701 | Stewart | Aug. 28, 1951 |

UNITED STATES PATENT OFFICE
CERTIFICATE OF CORRECTION

Patent No. 3,016,251                                   January 9, 1962

Walter J. Gilbert

It is hereby certified that error appears in the above numbered patent requiring correction and that the said Letters Patent should read as corrected below.

Column 3, line 72, for "one", first occurrence, read -- on --.

Signed and sealed this 24th day of April 1962.

(SEAL)
Attest:

ESTON G. JOHNSON
Attesting Officer

DAVID L. LADD
Commissioner of Patents